(12) United States Patent
Modell et al.

(10) Patent No.: US 7,582,354 B2
(45) Date of Patent: Sep. 1, 2009

(54) MATERIAL COMPOSITION

(75) Inventors: Jonas Modell, Sundsholm (SE); Staffan Thuresson, Gullbrandstorp (SE)

(73) Assignee: Ramlat Ltd., Msida (MT)

( * ) Notice: Subject to any disclaimer, the term of this patent is extended or adjusted under 35 U.S.C. 154(b) by 321 days.

(21) Appl. No.: 11/160,563

(22) Filed: Jun. 29, 2005

(65) Prior Publication Data

US 2006/0217459 A1   Sep. 28, 2006

(30) Foreign Application Priority Data

Mar. 23, 2005   (SE)   .................................... 0500663

(51) Int. Cl.
    *B32B 5/66* (2006.01)
(52) U.S. Cl. ...................... 428/403; 428/402; 428/405; 428/406; 428/407; 427/212; 427/221; 427/222
(58) Field of Classification Search ......... 428/403–407; 427/212, 221, 222
    See application file for complete search history.

(56) References Cited

U.S. PATENT DOCUMENTS

| | | | |
|---|---|---|---|
| 5,153,039 A * | 10/1992 | Porter et al. ............. | 428/36.92 |
| 5,374,384 A | 12/1994 | Berks et al. | |
| 5,567,757 A * | 10/1996 | Szczepanski ................ | 524/435 |
| 5,711,795 A | 1/1998 | Browning | |
| 6,881,781 B1 | 4/2005 | Gamba | |
| 2003/0131758 A1 | 7/2003 | Beindl et al. | |

FOREIGN PATENT DOCUMENTS

| | | |
|---|---|---|
| DE | 19615896 | 7/1997 |
| DE | 20200796 | 6/2002 |
| SE | 371101 | 11/1974 |
| SE | 511814 | 11/1999 |
| WO | WO 9903936 | 1/1999 |
| WO | WO 0007791 | 2/2000 |

OTHER PUBLICATIONS

International-Type Search Report from corresponding Swedish App. 0500663-0.

* cited by examiner

*Primary Examiner*—Leszek Kiliman
(74) *Attorney, Agent, or Firm*—WRB-IP LLP

(57) ABSTRACT

A material composition comprises, on the one hand, a particulate material and, on the other hand, a binder which is provided as a coating on the material particles. The binder has at least two solid phases (13, 14), of which one harder phase (14) is configurationally stable and a softer phase (13) is plastic and readily deformable at temperatures below the melting point of the binder. A method for producing the above material comprises the steps that at least two components included in the binder are melted and mixed, whereafter kneading takes place during cooling. The material composition is usable, for example, as a play material, educational material, for sculptures or prototypes or as landscape architectonic material.

22 Claims, 2 Drawing Sheets

MATERIAL COMPOSITION

TECHNICAL FIELD

The present invention relates to a material composition comprising, on the one hand, a particulate or granulate material and, on the other hand, a binder which is provided as a coating on the particles or grains of the material. For purposes of the application, the term "particulate" will be understood to encompass "granulate".

The present invention also relates to a method of producing a material composition comprising a particulate or granulate material and a binder, with at least two components, which is solid at room temperature, the components included in the binder being heated above their respective melting points and mixed.

The present invention further relates to the use of a material composition

Finally, the present invention relates to a binder for a material composition, the binder comprising at least two components.

Different types of modelling clays and the like for producing figures or sculptures have long been known in the art, on the one hand for artistic purposes and, on the other hand as a plaything or educational material for children. The problems inherent in many of these clay-like materials is that they are sticky and greasy and, in many cases, require pre-processing in order to render the material formable to the desired extent. Unfortunately, these clays may, after a period of use, become excessively soft and as a result tend to lose their shape at the same time as tackiness increases. Another drawback inherent in this type of clay-like material is that they are impossible to harden so that, for example, they can be used in the construction of, for example, landscapes for model railways or as decoration in aquariums etc.

A slightly different type of material has evolved in recent years in the form of sand compositions that have formability properties which can be likened to wet sand. A number of representative examples of this type of material are disclosed in U.S. Pat. No. 5,711,795 and WO 98/41408. These materials do not possess any real clay feeling as in the traditional modelling clays, but the graininess of the composition is manifest, i.e. the granulate structure of the sand included in the material is clearly apparent. The grains included in the sand or sand-like material have been coated with a layer of binder in order to hold together the grains when they are pressed against one another on the production of, for example, sculptures. The interspaces between the gains need not necessarily be entirely filled with binder, it being sufficient that the grains adhere to one another. Before working into different shapes, the material may very well be freely running, as is disclosed in, for example, U.S. Pat. No. 5,711, 795. A freely running material must be pressed together to form an unbroken, plastic body before, for instance, a sculpture can be produced therefrom. This is a major drawback.

The binder in these later compositions is a wax or wax-like material, for example beeswax. Unfortunately, this binder suffers from a number of drawbacks. One drawback is that was shows a tendency to gradually soften as the temperature increases. In such instance, it also becomes sticky. Such an increase in temperature, as typically takes place when the material is manually worked, implies that the material becomes even stickier and it is then difficult for the material to retain its pristine shape. When the temperature becomes excessively high, for example if the finished figures or sculptures are illuminated by powerful spotlights, they cannot always keep their shape but show a tendency to collapse or sink together.

At the same time, the wax is quite hard at lower temperatures and, in order to achieve the desirable formability, the material must first be processed or worked for a while. This may be tiring and demanding on the patience if the sand material is to be used by young children. A further disadvantage is that wax often gives a greasy or sticky feeling and the risk of stains on clothing or to the surroundings cannot be discounted.

There is thus a need in the art to realize a material composition which is of moderate softness for direct use and which maintains approximately the same softness throughout its entire service life, but which also may successfully be hardened in order to maintain the achieved shape. Moreover, the material should be suitable to be handled by children.

According to an aspect of the present invention, a material composition comprises a binder having at least two solid phases, one harder phase being configurationally stable and a softer phase being plastic and readily deformable at temperatures below the melting point of the binder.

According to another aspect of the present invention, in a method a binder composition is kneaded during cooling, there being formed a softer, solid phase which is plastic and readily deformable at temperatures below the melting point of the binder.

According to yet another aspect of the present invention, a material composition is adapted for use as a play material, an educational material, a landscape architectonic aid, sculptures, prototypes, a material for museum interior design an aquarium decoration, a material for industrial design or a liquid-proof layer in which event the sand material composition is formed to a desired shape.

According to yet another aspect of the present invention, a binder has at least two solid phases, a harder phase being configurationally stable and a softer phase being plastic and readily deformable at temperatures below the melting point of the binder.

BRIEF DESCRIPTION OF THE ACCOMPANYING DRAWINGS

The present invention will now be described in greater detail herein below, with reference to the accompanying Drawings. In the accompanying Drawings.

DESCRIPTION OF PREFERRED EMBODIMENT

Figure 1:
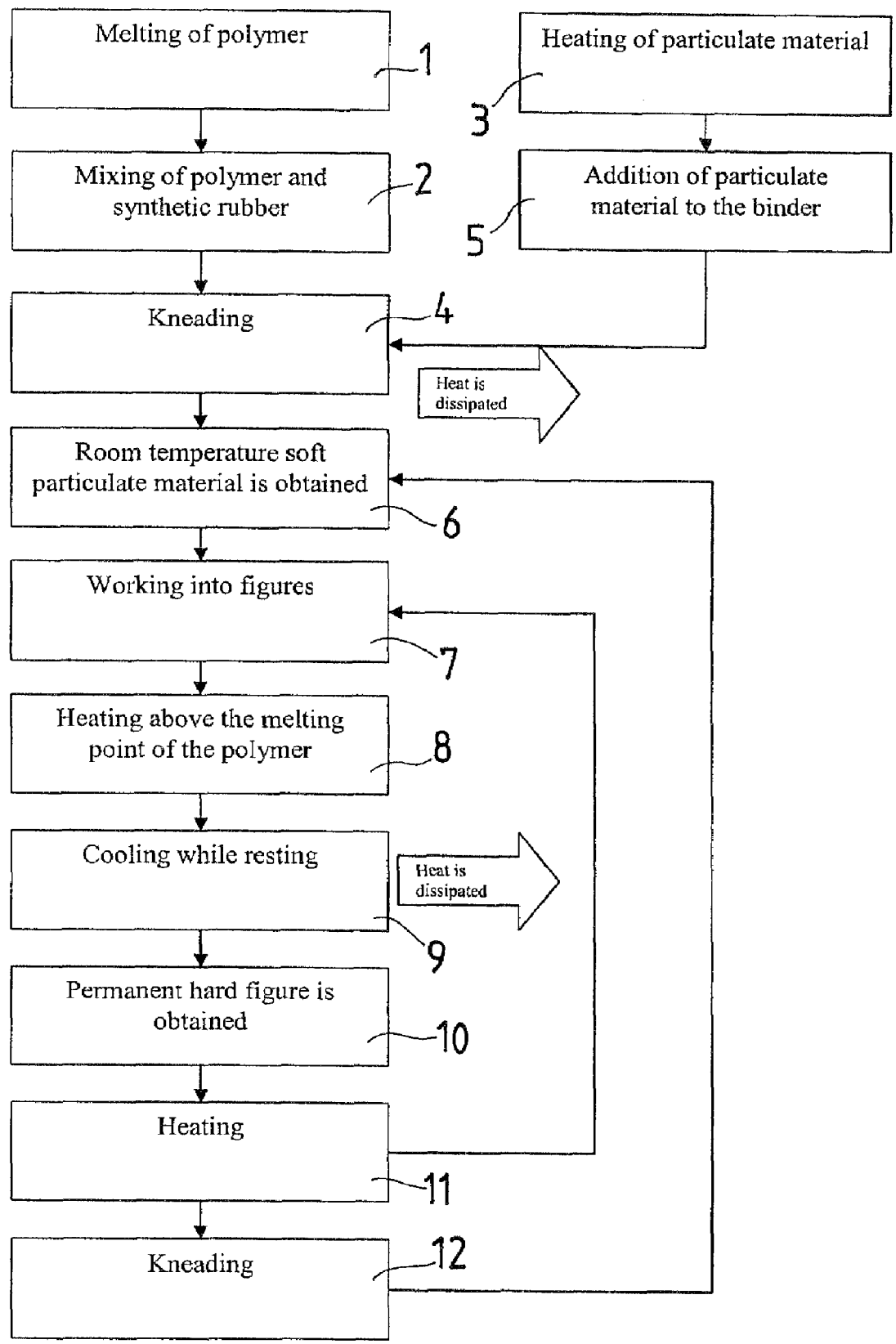
FIG. 1 is a block diagram showing the production process.
Figure 2:
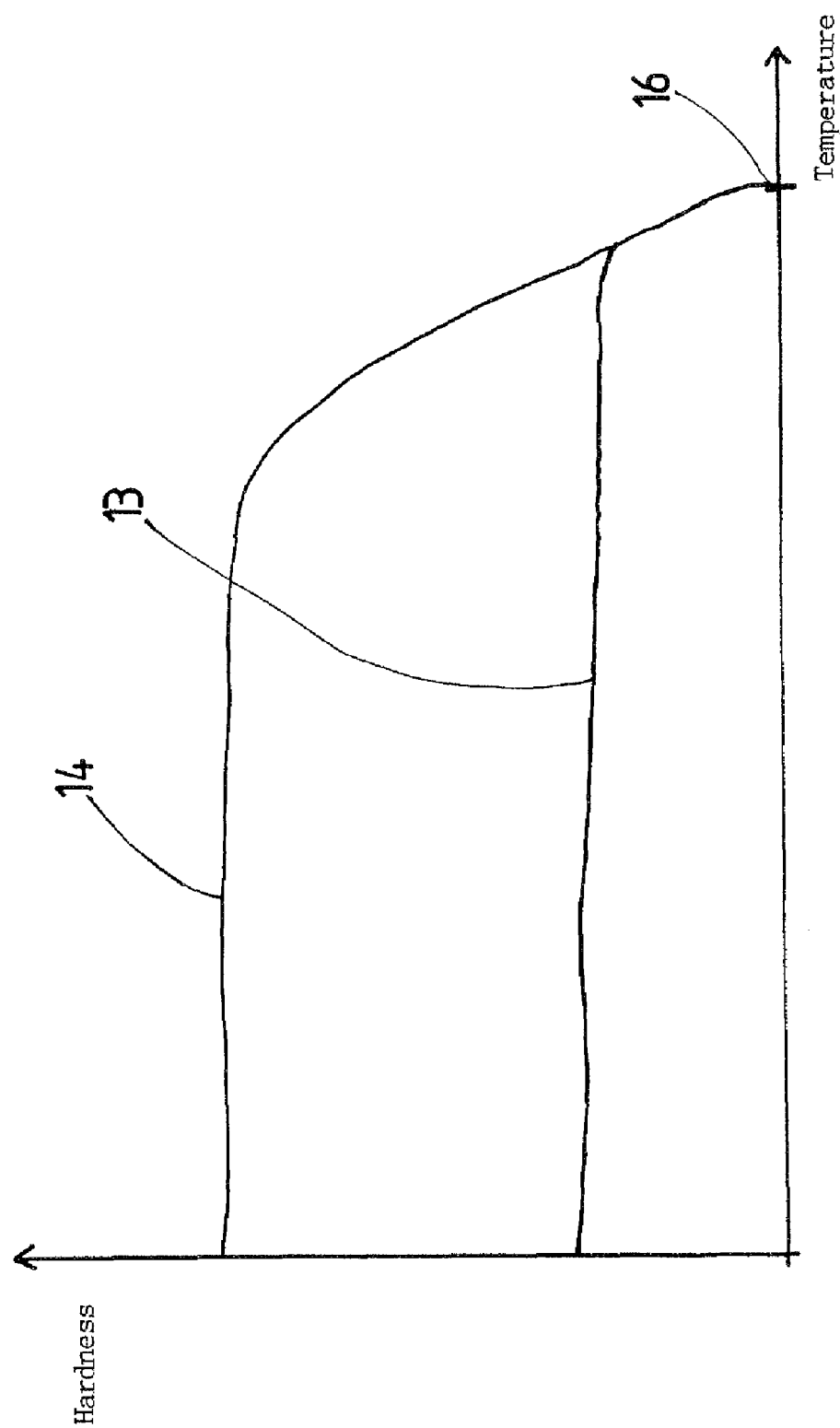
FIG. 2 is a skeleton diagram of the hardness of the material as a function of the temperature in two different solid phases.

A feature generally applicable to the material composition is that it is important that a feeling of a certain graininess is obtained and that not excessive amounts of binder are added to the composition. The quantity of binder lies in the order of magnitude of between volume % and 15 volume % of the finished material composition. Preferably, the binder concentration is between 2 and 10 volume %.

The grain size of the particulate or granular material included in the material is important, since it is a part of the control apparatus for absorbing the correct quantity of binder on the grains in order to obtain the sought-for handling properties. If the grains are too large, the absorbed quantity of binder on their surface will not be sufficient for the grains to hold together and function as a building material for models and figures, since large grains or particles have far too few points of contact with one another. If the grains are too small, their total surface area will be too large and the binder cannot cover the grains, which will have as a consequence that the finished composition will tend to be dusty as a result of uncovered grains that are released on kneading of the sand material composition. It might possibly be conceivable to provide an increase of binder in order to compensate for this, but such an increase often results in the material having an undesired consistency, since a part of the sand grains included will be wholly enclosed in the binder mass and the sandy structure will be suppressed or disappear.

Since the object of the present invention is that each grain or particle will display, if possible, a wholly covering layer of binder, the size and natural density of the grains is of crucial importance at least as long as the recipes are calculated in weight %. For this reason, both weight and volume % are given in the table below.

If the natural density of the particles at constant particle size is high, such as, for example, in sand, they will have a surface per weight unit of 200 to 350 $cm^2/g$; if the natural density is medium high, as in ceramic light weight particles, the corresponding value will be approx. 1,000 $cm^2/g$; while in light particles (polymer light weight particles), it will be of the order of magnitude of 60,000 $cm^2/g$. Practical trials have shown that it is possible without difficulty to surface coat particles with a surface-weight ratio of at least up to 1,000 with the binder compositions pertinent according to the present invention, while it has proved to be impossible to achieve this if the surface-weight ratio is of the order of magnitude of 60,000 $cm^2/g$.

Correspondingly, the particle size at constant natural density of the particles also has an effect, since small particles have a larger surface in relation to weight. This effect must thus be superposed on the effect of the density. Trials have demonstrated that, with sand as the particulate material, mean particle sizes of between 0.02 and 0.5 mm can be handled, preferably between 0.05 and 0.15 mm.

As particulate material, use may be made of sand or other sand-like materials, but also ground marble, grains or balls of polymers, flying ash, microspheres of plastic, ceramics or glass which are hollow in order to achieve a lower weight in the material. Moreover, mixtures of several different types of sand or sand-like materials may be employed. The material must also withstand the temperatures that are attained during the production process, i.e. at least 60 to 120° C.

The material composition is intended, in many cases, to be handled by children even though adults may also greatly enjoy the material. As a result, the material composition should be non-toxic, both in normal handling and if minor quantities are swallowed or if a child licks its fingers after having handled the material composition. Further, the material should have a tolerable smell, so that neither those working with the material composition nor the surroundings find such handling unpleasant or repellent, both during and after handling.

The material composition should further have a well-balanced tackiness so that it is simple to cause the material to hold together for the formation of figures and/or sculptures. Moreover, it should be of moderate softness at the temperature at which it is intended to be handled, i.e. in general a room temperature of about 20° C. The softness should be such that the material can be used by children even though they have limited strength in the grip. The material should also be capable of being used immediately without any introductory working or kneading that requires patience. Nor should the material change properties after a period of handling, since it typically becomes warmer because of the temperature of the user's hands. The limited forces that are required for working the material also make for fine chiselling of the figures and sculptures that are produced without any advanced tools. The softness of the material should be constant so that it does not soften considerably on a slight increase in temperature during lengthy periods of time, a feature that, within the prior art technology, could occasionally result in finished sculptures collapsing or deflating. Finally, the material should also be such that it is not greasy or sticky. The material should not deposit residue on material such as clothes or carpets or other surfaces. This facilitates cleaning of the places where the material is used, such as day home nurseries and schools.

The previously mentioned properties regarding non-toxicity, smell, tackiness and softness depend for the greater part on the binder included in the material composition. A binder that, to a greater degree than prior art binders, satisfies these requirements is, in the preferred embodiment, a mixture of a polymer and a synthetic rubber. It is to be particularly preferred if the polymer is an ethylene vinyl acetate polymer (EVA) and if the synthetic rubber is polyisobutylene. The softness and tackiness of the two ingredients are such that when they are mixed in suitable proportions, typically where the synthetic rubber constitutes between 20 and 35 weight % of the binder composition, the final product will be approximately as that just disclosed, but on condition that the following method is applied. Relatively hard polymers that per se are not tacky generally function well as a base for the binder.

Every admixture of synthetic rubber in the polymer improves its properties however, in particular as regards the desired softness. By an admixture of synthetic rubber, there will be obtained two solid phases, one soft and one hard solid phase. The soft phase is readily deformable and plastic, while the hard phase is configurationally stable. The concentration of synthetic rubber may be quite high, approx. 20 to 35%, but should not exceed 50% of the binder composition given that the polymer is to be considered as the base of the binder. In one particularly preferred embodiment, 32.4% Oppanol® and 67.6% EVA polymer were used. Further examples of mixtures will be disclosed in the table, both in weight % and in volume %.

The preferred method for the production of the binder is shown in FIG. 1 in the form of a block diagram. In step 1, the basic component, i.e. the polymer, is melted. The melting point lies in the range of between 60 and 120° C. In step 2, the melted polymer is mixed with the synthetic rubber which, already at room temperature, is to be considered as fluid even though with high viscosity. This is occasionally described such that the material is cold fluid. Possibly, the mixture of the two included components may take place simultaneously with heating to the melting point of the polymer, i.e. steps 1 and 2 are carried out at the same time. In another vessel, the sand or particulate material which is to be included in the finished material is heated up to substantially the same temperature as the mixed melt of polymer and synthetic rubber.

In step 4, the mixture of polymer and synthetic rubber is kneaded or processed mechanically, at the same time as heat is given off, i.e. during cooling.

The heated particulate material or sand is added either before or during step 4, i.e. the kneading step. The desired result, i.e. the sand material with the desired properties, will be attained when the material has, on the one hand, been kneaded so much that the binder has reached its soft solid phase, at the same time as in principle all or the greater part of the included particles have received a coating of the binder and tend to separate, i.e. it is possible to have a certain spacing between the binder-coated grains. When this has taken place and room temperature has been reached, there will be obtained a sand material with a binder in the soft phase, i.e. the binder is in solid form but is soft and can be worked with the hands. Preferably, the material is composite rather than freely running as was the case in the prior art technology.

The material composition is soft at both room temperature (about 20° C.) and at storage temperature (about 10° C.) and hand temperature (about 35° C.). The material mixture is thus quite insensitive to temperature and maintains its superior working properties within a broad temperature range. It has been possible to ascertain that the softness of the sand material that is obtained in step 6 depends on how powerfully and prolonged the processing or working was which was carried out in step 4.

The softness and hardness, respectively, may be assessed, for example, by testing with a metal cone which is pressed against the material with a predetermined force over a predetermined period of time. The softer the material is, the deeper will be the depression after the cone. Other measurement methods also occur.

It has also proved in practical experiments that the higher the proportion of binder employed in the material composition, the harder it may be, and vice versa.

The material which is obtained in step 6 can then be directly worked into sculptures or figures without any pre-working or additional heating in step 7. When such a figure or sculpture has been created which is to be saved, it is possible to harden the sculpture by heating above the melting point in step 8. Such a heating may either be carried out in a normal household oven or, as may be necessary in larger sculptures or landscapes, with the aid of a hot air gun. In such an event, the binder will melt, but, since the viscosity of the binder is high, even in the molten state the shape and configuration of the sculpture will be maintained at least on condition that, at this point in time, it is not subjected to any mechanical action. This is a major advantage which may be further accentuated if particles of low natural density are employed, since the effects of the force of gravity will then be reduced.

Thereafter, the sculpture if left in step 9 to cool. Since no mechanical processing takes place in this step while the heat is dissipated, the binder will assume its solid, hard phase. At the same time, bridges of binder are also formed between the particles and, also in these bridges, the binder is in its hard phase. A permanent, hard figure will therefore be obtained in step 10. The figure is not only hard, but also water resistant. Thus, sculptures and landscapes that have been produced in this manner are possible to use as aquarium decoration or the like.

It is also possible in this step to obtain a shell structure if only the surface of a figure has reached the melting point of the binder. If, in such instance, the bottom of the figure is left unaffected, the interior of the figure will still be soft and can therefore be hollowed out. The same applies if a relief structure is created and hardened on its upper side, for example a landscape structure, whereafter the upper, hardened layer is lifted off from the substrate. In such instance, the soft, unhardened material on the underside of the structure will remain on the substrate.

If the intention is not to keep a hardened structure, it is possible to recycle it by heating to the melting point of the binder in step 11 and a subsequent kneading or other mechanical processing in step 12. In such instance, the material is recycled, when it has cooled to room temperature, to its original shape as in step 6. Thereafter, it is possible once again to work the material into new sculptures.

If desired, the sculpture may be reworked in that the heating in step 11 is followed by a local mechanical processing of the sculpture where it is desired to rework the sculpture. The heating in step 11 should also be partial. As a result of the renewed heating, the binder of the material will melt and before it has returned to its hard phase at room temperature, it is possible to work the figure further. Thereafter, it is possible once again to allow the sculpture to cool to its solid, hard phase. This may be carried out an indeterminate, not to say infinite number of times.

In the foregoing, a mixture of a polymer and a synthetic rubber was described. It is possible to obtain corresponding material properties with a hard and soft phase, respectively, at room temperature even if the polymer, which is the base of the binder, has been replaced by microcrystalline wax. The addition of synthetic rubber may be modified to some degree depending on its proportion of the total composition. A number of examples of working compositions are given below in the table.

In the table, examples are given of compositions of polymers or wax and synthetic rubbers of different types. Those particles that are employed may also be of different types.

Escorene are copolymers of ethylene and vinyl acetate, and two different variations thereof are included in the table.

Luvax EVA 1 is an ethylene copolymer wax, while Luvax A is en ethylene homopolymer wax.

Those synthetic rubbers that are presented in the table are a couple of variations of Oppanol, which is a polyisobutene, Hyvis 2000, which is an isobutene, Vistanex, which is a polyisobutylene, as a well as Dynapak, which is a polyisobutylene.

The particles that are employed are E-spheres, hollow ceramic spheres and Silica sand, which is silicate sand or natural sand. E-spheres have lower density than the sand, which implies that their surface area per unit of mass is greater at equal particle size. This implies that the concentration of binder in weight % must be greater for light particles than for heavy.

It is also possible to apply other methods for hardening of the surface of sculptures produced from the material composition in its soft phase. In such instance, a polymer dispersion is brushed or sprayed onto to the surface of the finished sculpture. Thereafter, the sculpture is not subjected to any further mechanical action. The applied polymers penetrate into the material composition in the interspaces between the coated grains included in the material composition. In order to facilitate this penetration, tensides have been added in the polymer dispersion in order to break down the surface tension. Moreover, an emulsifier is possibly also added. Since the sculpture, which is drenched in its surface layer with the polymer dispersion, is not subjected to any additional kneading, the polymers will set to a hard phase when the carrier in the dispersion has evaporated. The hard surface can be up to a centimeter thick. By such means, a shell structure will be realised which corresponds to that obtained if only the surface layer of a sculpture is heated, as was described above. If the desire is to recycle a sculpture which has been hardened using a polymer dispersion, a heating as described in step 11 with respect to FIG. 1 with subsequent kneading in accordance with step 12 would probably result in a soft material being obtained, as in step 6. However, the concentration of polymer in the recycled material has increased somewhat.

For the preferred embodiment, it was disclosed that the kneading begins immediately after the molten polymer has been mixed with the synthetic rubber, i.e. while the temperature of the composition is still close to the melting point of the polymer. However, it is possible to cool the compound partly without mechanical processing and only thereafter begin a kneading of the composition of the binder and the particulate material or the sand until such time as all particles are separated and have been coated with a surface layer of kneaded binder.

Yet a further alternative method is that the particles which have been mixed with the binder composition are cooled so that they separate and a stratum of binder hardens and sets on their surface. Thereafter, the coated particles are kneaded while cooling to room temperature continues. The more and longer the kneading is carried out, the greater will be the difference between the hard phase and the soft phase achieved in the binder.

The present invention may be modified further without departing from the scope of the appended Claims.

TABLE

| Recipe 1 | Polymer/wax Escorene MV02514 | Synthetic rubber Oppanol B10N | Particle E-Spheres SLG | Total weight (gram) | Total volume (cc) |
|---|---|---|---|---|---|
| Dosing (g) | 4760 | 2040 | 130000 | 136800 | |
| Weight % | 3.5% | 1.5% | 95.0% | 100.0% | |
| Density/bulk density (g/cm$^3$) | 0.93 | 0.92 | 0.40 | Compacted density 0.45 g/cc | |
| Volume (cm$^3$) | 5118 | 2217 | 325000 | | 332336 |
| Volume % | 1.5% | 0.7% | 97.8% | | 100.0% |

| Recipe 2 | Escorene MV30013 | Oppanol B12N | E-Spheres SLG | Total weight (gram) | Total volume (cc) |
|---|---|---|---|---|---|
| Dosing (g) | 5100 | 1700 | 61000 | 67800 | |
| Weight % | 7.5% | 2.5% | 90.0% | 100.0% | |
| Density/bulk density (g/cm$^3$) | 0.93 | 0.92 | 0.40 | Compacted density 0.45 g/cc | |
| Volume (cm$^3$) | 5484 | 1848 | 152500 | | 159832 |
| Volume % | 3.4% | 1.2% | 95.4% | | 100.0% |

| Recipe 3 | Luvax EVA1 | Hyvis 2000 | E-Spheres SLG | Total weight (gram) | Total volume (cc) |
|---|---|---|---|---|---|
| Dosing (g) | 5400 | 1360 | 38500 | 45300 | |
| Weight % | 12.0% | 3.0% | 85.0% | 100.0% | |
| Density/bulk density (g/cm$^3$) | 0.93 | 0.92 | 0.40 | Compacted density 0.45 g/cc | |
| Volume (cm$^3$) | 5849 | 1478 | 96250 | | 103578 |
| Volume % | 5.6% | 1.4% | 92.9% | | 100.0% |

| Recipe 4 | Escorene MV02514 | Vistanex LM-MS | E-Spheres SL150 | Total weight (gram) | Total volume (cc) |
|---|---|---|---|---|---|
| Dosing (g) | 4760 | 2040 | 130000 | 136800 | |
| Weight % | 3.5% | 1.5% | 95.0% | 100.0% | |
| Density/bulk density (g/cm$^3$) | 0.93 | 0.92 | 0.40 | Compacted density 0.45 g/cc | |
| Volume (cm$^3$) | 5118 | 2217 | 325000 | | 332336 |
| Volume % | 1.5% | 0.7% | 97.8% | | 100.0% |

| Recipe 5 | Escorene MV30013 | Oppanol B10N | E-Spheres SL150 | Total weight (gram) | Total volume (cc) |
|---|---|---|---|---|---|
| Dosing (g) | 5100 | 1700 | 61000 | 67800 | |
| Weight % | 7.5% | 2.5% | 90.0% | 100.0% | |
| Density/bulk densitet (g/cm$^3$) | 0.93 | 0.92 | 0.40 | Compacted density 0.45 g/cc | |
| Volume (cm$^3$) | 5484 | 1848 | 152500 | | 159832 |
| Volume % | 3.4% | 1.2% | 95.4% | | 100.0% |

| Recipe 6 | Luvax EVA1 | Hyvis 2000 | E-Spheres SL150 | Total weight (gram) | Total volume (cc) |
|---|---|---|---|---|---|
| Dosing (g) | 5440 | 1360 | 38500 | 45300 | |
| Weight % | 12.0% | 3.0% | 85.0% | 100.0% | |
| Density/bulk | 0.93 | 0.92 | 0.40 | Compacted | |

TABLE-continued

| | | | | density 0.45 g/cc | | |
|---|---|---|---|---|---|---|
| Volume (cm³) | 5849 | 1478 | 96250 | | 103578 | |
| Volume % | 5.6% | 1.4% | 92.9% | | 100.0% | |

| Recipe 7 | Escorene MV02514 | Dynapak Poly-4250 | Silica sand GA39 | Total weight (gram) | Total volume (cc) |
|---|---|---|---|---|---|
| Dosing (g) | 4760 | 2040 | 330000 | 336800 | |
| Weight % | 1.4% | 0.6% | 98.0% | 100.0% | |
| Density/bulk density (g/cm³) | 0.93 | 0.92 | 1.50 | Compacted density 1.50 g/cc | |
| Volume (cm³) | 5118 | 2217 | 220000 | | 227336 |
| Volume % | 2.3% | 1.0% | 96.8% | | 100.0% |

| Recipe 8 | Polyethylene wax PE520 | Oppanol B10N | Silica sand GA39 | Total weight (gram) | Total volume (cc) |
|---|---|---|---|---|---|
| Dosing (g) | 5100 | 1700 | 165000 | 171800 | |
| Wseight % | 3.0% | 1.0% | 96.0% | 100.0% | |
| Density/bulk density (g/cm³) | 0.93 | 0.92 | 1.50 | Compacted density 1.50 g/cc | |
| Volume (cm³) | 5484 | 1848 | 110000 | | 117332 |
| Volume % | 4.7% | 1.6% | 93.8% | | 100.0% |

| Recipe 9 | Luvax EVA1 | Oppanol B15N | Silica sand GA39 | Total weight (gram) | Total volume (cc) |
|---|---|---|---|---|---|
| Dosing (g) | 5440 | 1360 | 106000 | 112800 | |
| Weight % | 4.8% | 1.2% | 94.0% | 100.0% | |
| Density/bulk density (g/cm³) | 0.93 | 0.92 | 1.50 | Compacted density 1.50 g/cc | |
| Volume (cm³) | 5849 | 1478 | 70667 | | 77994 |
| Volume % | 7.5% | 1.9% | 90.6% | | 100.0% |

Recipes 1 to 6 relate to light particulate material, while 7 to 9 relate to heavy particulate material, such as sand.

What is claimed is:

1. A material composition comprising a particulate material and a binder which is provided as a coating on particles of the particulate material, wherein the binder has at least two solid phases of which one harder phase is configurationally stable and a softer phase is plastic and readily deformable at temperatures below a melting point of the binder, wherein the material composition comprises the binder kneaded together with the particulate material during cooling from the melting point of the binder so that the softer phase of the binder is attained.

2. The material composition as claimed in claim 1, wherein the binder has the two solid phase at room temperature.

3. The material composition as claimed in claim 1, wherein the harder phase of the binder is attained after cooling while the binder is mechanically unaffected.

4. The material composition as claimed in claim 1, wherein the binder has at least one component, a first component of the at least one component being synthetic rubber.

5. The material composition as claimed in claim 4, wherein the binder has at least two components, a second component of the at least two components being a polymer or a wax.

6. The material composition as claimed in claim 1, wherein particles in the particulate material have a size of between 0.02 and 0.5 mm.

7. A method of producing a material composition comprising a particulate material and a binder with at least two included components which are solid at room temperature, comprising heating components included in the binder to above their respective melting points and mixing the components, adding the particulate material and the binder, and kneading the particulate material together with the binder composition during cooling from the melting point of the binder material to obtain the material composition having, at room temperature, one solid, soft phase which is plastic and readily deformable.

8. The method as claimed in claim 7, wherein the particulate material is mixed in the binder while the binder cools.

9. The method as claimed in claim 8, wherein the particulate material is mixed in the binder when the binder is in a fluid phase.

10. Use of a material composition as claimed in claim 1 as at least one of a play material, educational material, a landscape architectonic aid, sculptures, prototypes or material for museum interior decoration or aquarium decoration, a material for industrial design or a liquid-sealing layer, by forming the material composition to the to a desired after cooling the material composition to room temperature.

11. Use as claimed in claim 10, comprising hardening the material composition after it has been formed to the desired shape, at least in a surface layer, by elevating a temperature of the material composition and subsequently cooling the material composition.

12. Use as claimed in claim 10, comprising hardening the material composition after it has been formed to the desired shape by applying a fixing agent on a surface of the material composition.

13. A binder adapted to have at least two solid phases, of which two phases one harder phase is configurationally stable and a softer phase is plastic and readily deforinable at temperatures below a melting point of the binder and is attained after kneading of the binder during cooling from a melting point of the binder, the binder being in the softer phase.

14. The binder as claimed in claim 13, wherein the harder phase is attained after cooling while the binder is mechanically unaffected.

15. The binder as claimed in claim 13, wherein the binder has at least one component, a first component of the at least one component being a synthetic rubber.

16. The binder as claimed in claim 15, wherein the binder has at least two components, a second component of the at least two components being a polymer or a wax.

17. The material composition as claimed in claim 1, wherein particles in the particulate material have a size of between 0.05 and 0.150 mm.

18. The material composition as claimed in claim 1, wherein the binder comprises 2-10% by volume of the material composition.

19. The material composition as claimed in claim 1, wherein the particulate material is heated before it is mixed with the binder.

20. The method as claimed in claim 7, comprising heating the particulate material before adding the particulate material and the binder.

21. The method as claimed in claim 20, comprising heating the particulate material to substantially the same temperature as the binder before adding the particulate material and the binder.

22. An article made from the material composition according to claim 1 by forming the material composition to a desired shape after cooling the material composition to room temperature.

* * * * *